US008855704B2

(12) United States Patent
Sambhwani et al.

(10) Patent No.: US 8,855,704 B2
(45) Date of Patent: Oct. 7, 2014

(54) FAST CELL SELECTION IN TD-CDMA (UMTS TDD)

(75) Inventors: Sharad Sambhwani, San Diego, CA (US); Avneesh Agrawal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1109 days.

(21) Appl. No.: 11/365,360

(22) Filed: Feb. 28, 2006

(65) Prior Publication Data

US 2007/0049324 A1 Mar. 1, 2007

Related U.S. Application Data

(60) Provisional application No. 60/711,989, filed on Aug. 26, 2005.

(51) Int. Cl.
*H04B 7/00* (2006.01)
*H04W 48/20* (2009.01)
*H04W 36/18* (2009.01)

(52) U.S. Cl.
CPC .............. *H04W 48/20* (2013.01); *H04W 36/18* (2013.01)
USPC ........ 455/525; 455/434; 455/435.2; 455/436; 455/437; 455/442; 455/443

(58) Field of Classification Search
CPC ..... H04W 36/24; H04W 36/26; H04W 36/28; H04W 36/30; H04W 36/34; H04W 36/36
USPC ........................................................ 455/525
See application file for complete search history.

(56) References Cited

U.S. PATENT DOCUMENTS

| 5,757,767 A | 5/1998 | Zehavi |
| 5,781,541 A | 7/1998 | Schneider |
| 5,848,060 A | 12/1998 | Dent |

(Continued)

FOREIGN PATENT DOCUMENTS

| CN | 1353887 A | 6/2002 |
| CN | 1378357 A | 11/2002 |

(Continued)

OTHER PUBLICATIONS

"Universal Mobile Telecommunications System (UMTS)," ETSI Standards, European Telecommunications Standards Institute, 3GPP TA 25.331 version 6.5.0 Release, vol. 3-R2, No. V650, Mar. 2005.

(Continued)

*Primary Examiner* — Mazda Sabouri
(74) *Attorney, Agent, or Firm* — Thomas A. Jolly

(57) ABSTRACT

Systems and methodologies are described that facilitate performing fast cell selection in a user device wherein the user device can select a serving sector from a list of sectors in its virtual active set (VAS), while in communication with a wireless network. The serving sector can be different from a nominal sector whose scrambling code the user device employs for transmission on the uplink, which scrambling code can be known to all sectors listed in the VAS for the user device. In this manner, all sectors in whose coverage area the user device is located can be included in the user device's VAS and can receive and demodulate transmissions there from.

44 Claims, 10 Drawing Sheets

(56) References Cited

U.S. PATENT DOCUMENTS

| | | | |
|---|---|---|---|
| 6,038,450 A | 3/2000 | Brink et al. | |
| 6,091,757 A | 7/2000 | Cudak et al. | |
| 6,134,215 A | 10/2000 | Agrawal et al. | |
| 6,233,231 B1 | 5/2001 | Felix et al. | |
| 6,370,182 B2 | 4/2002 | Bierly et al. | |
| 6,374,122 B1 | 4/2002 | Leung | |
| 6,388,998 B1 | 5/2002 | Kasturia | |
| 6,396,822 B1 | 5/2002 | Sun et al. | |
| 6,519,277 B2 | 2/2003 | Eidson | |
| 6,741,550 B1 | 5/2004 | Shin | |
| 6,804,216 B1 | 10/2004 | Kuwahara et al. | |
| 6,845,238 B1 * | 1/2005 | Muller | 455/436 |
| 6,965,633 B2 | 11/2005 | Sun et al. | |
| 6,973,062 B1 | 12/2005 | Han | |
| 6,980,527 B1 | 12/2005 | Liu et al. | |
| 6,996,056 B2 | 2/2006 | Chheda et al. | |
| 7,099,372 B2 | 8/2006 | Nieczyporowicz et al. | |
| 7,123,579 B1 | 10/2006 | Lyu | |
| 7,239,847 B2 | 7/2007 | Attar et al. | |
| 7,272,110 B2 | 9/2007 | Lee et al. | |
| 7,280,467 B2 | 10/2007 | Smee et al. | |
| 7,298,805 B2 | 11/2007 | Walton et al. | |
| 7,324,429 B2 | 1/2008 | Walton et al. | |
| 7,391,755 B2 | 6/2008 | Gopalakrishnan et al. | |
| 7,411,899 B2 | 8/2008 | Kavak et al. | |
| 7,650,154 B2 | 1/2010 | Pedersen et al. | |
| 7,925,225 B2 | 4/2011 | Wu et al. | |
| 8,068,464 B2 | 11/2011 | Sambhwani et al. | |
| 8,130,727 B2 | 3/2012 | Sambhwani et al. | |
| 2001/0028675 A1 | 10/2001 | Bierly et al. | |
| 2002/0018520 A1 | 2/2002 | Eidson | |
| 2002/0067759 A1 | 6/2002 | Ertel et al. | |
| 2002/0197997 A1 * | 12/2002 | Attar et al. | 455/446 |
| 2003/0031119 A1 * | 2/2003 | Kim et al. | 370/200 |
| 2003/0202563 A1 | 10/2003 | Das et al. | |
| 2004/0037238 A1 | 2/2004 | Schiff et al. | |
| 2004/0071115 A1 | 4/2004 | Earnshaw et al. | |
| 2004/0146093 A1 | 7/2004 | Olson et al. | |
| 2004/0179544 A1 | 9/2004 | Wilson et al. | |
| 2004/0184570 A1 | 9/2004 | Thomas et al. | |
| 2004/0252665 A1 | 12/2004 | Clark et al. | |
| 2004/0257975 A1 | 12/2004 | Proctor, Jr. | |
| 2005/0105485 A1 | 5/2005 | Cleveland | |
| 2005/0111408 A1 | 5/2005 | Skillermark et al. | |
| 2005/0128985 A1 | 6/2005 | Liberti et al. | |
| 2005/0226267 A1 | 10/2005 | Pedersen et al. | |
| 2005/0226414 A1 | 10/2005 | Lee et al. | |
| 2006/0013250 A1 | 1/2006 | Howard et al. | |
| 2006/0045170 A1 | 3/2006 | Van Rensburg et al. | |
| 2006/0058056 A1 * | 3/2006 | Das et al. | 455/524 |
| 2007/0019535 A1 | 1/2007 | Sambhwani et al. | |
| 2007/0249355 A1 * | 10/2007 | Kang et al. | 455/439 |
| 2007/0270155 A1 * | 11/2007 | Nelson et al. | 455/452.2 |
| 2008/0069015 A1 | 3/2008 | Walton et al. | |
| 2008/0280611 A1 * | 11/2008 | Miklos et al. | 455/436 |
| 2010/0034189 A1 * | 2/2010 | Ranta | 370/350 |

FOREIGN PATENT DOCUMENTS

| | | |
|---|---|---|
| EP | 0957604 | 11/1999 |
| EP | 1396956 | 3/2004 |
| GB | 2378857 | 2/2003 |
| JP | 2002515203 T | 5/2002 |
| JP | 2003134550 | 5/2003 |
| JP | 2004248315 A | 9/2004 |
| JP | 2005006343aA | 1/2005 |
| JP | 2005110130 A | 4/2005 |
| JP | 2007512773 T | 5/2007 |
| JP | 2007529963 A | 10/2007 |
| KR | 20010043533 | 5/2001 |
| KR | 1020040010782 | 1/2004 |
| WO | WO9737456 A2 | 10/1997 |
| WO | 0074255 | 12/2000 |
| WO | WO0074255 A1 | 12/2000 |
| WO | 01/20942 A | 3/2001 |
| WO | 0122607 | 3/2001 |
| WO | WO0172081 | 9/2001 |
| WO | 02/03561 A | 1/2002 |
| WO | 02056517 | 7/2002 |
| WO | 03/081930 A1 | 10/2003 |
| WO | 2004010573 | 1/2004 |
| WO | WO2005053186 A1 | 6/2005 |
| WO | WO2005091518 | 9/2005 |

OTHER PUBLICATIONS

Monogioudis, P., et al. "Intelligent Antenna Solutions for UMTS: Algorithms and Simulation Results." IEEE Communications Magazine, IEEE Service Center, New York, NY, US, vol. 42, No. 10, Oct. 2004, pp. 28-39.

International Search Report—PCT/US06/033771—International Search Authority—European Patent Office—Jan. 19, 2007.

Written Opinion—PCT/US06/033771—International Search Authority—European Patent Office, Munich—Jan. 19, 2007.

International Preliminary Report on Patentability—PCT/US06/033771—International Search Authority—The International Bureau of WIPO—Geneva, Switzerland—Feb. 26, 2008.

"Cdme2000 High Rate Packet Data Air-Interface Specification." TIA IS-856, V.2, Oct. 27, 2000.

"Spreading and Modulation (TDD)", 3GPP TS 25.223, V.6.0.0 (Dec. 2003).

Adaptive Antennas and MIMO Systems for Wireless Communications; Intelligent Antenna Solutions for UMTS: Algorithms and Simulation Results P-28-29 PD: 00.10.2004 VN: 2460.

Taiwan Search Report—TW095139877—Oct. 31, 2009.

Tango GG., "statistical multiplexing", http://www.moon-soft.com/program/bbs/readelite27918.htm, Apr. 3, 2001.

* cited by examiner

FAST CELL SELECTION IN TD-CDMA (UMTS TDD)

CLAIM OF PRIORITY UNDER 35 U.S.C. §119

The present Application for Patent claims priority to Provisional Application No. 60/711,989 entitled "FAST CELL SELECTIN IN TD-CDMA (UMTS TDD)" filed Aug. 26, 2005, and assigned to the assignee hereof and hereby expressly incorporated by reference herein.

REFERENCE TO CO-PENDING APPLICATIONS FOR PATENT

The present Application for Patent is related to the following co-pending U.S. Patent Applications:

U.S. patent application Ser. No. 11,365/218, now U.S. Pat. No. 8,130,727 titled, "QUASI-ORTHOGONAL ALLOCATION OF CODES IN TD-CDMA SYSTEMS", which is assigned to the assignee hereof, and expressly incorporated by reference herein; and U.S. patent application Ser. No. 11/553,973, now U.S. Pat. No. 8,068,454, titled, "VARYING SCRAMBLING/OVSF CODES WITHIN A TD-CDMA TO OVERCOME JAMMING EFFECT BY A DOMINANT INTERFERER", which is assigned to the assignee hereof, and expressly incorporated by reference herein.

BACKGROUND

I. Field

The following description relates generally to wireless communications, and more particularly to providing fast cell selection in a universal mobile telecommunication system wireless environment.

II. Background

Wireless communication systems have become a prevalent means by which a majority of people worldwide has come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

More particularly, frequency division based techniques typically separate the spectrum into distinct channels by splitting it into uniform chunks of bandwidth, for example, division of the frequency band allocated for wireless communication can be split into 30 channels, each of which can carry a voice conversation or, with digital service, carry digital data. Each channel can be assigned to only one user at a time. One known variant is an orthogonal frequency division technique that effectively partitions the overall system bandwidth into multiple orthogonal subbands. These subbands are also referred to as tones, carriers, subcarriers, bins, and/or frequency channels. Each subband is associated with a subcarrier that can be modulated with data. With time division based techniques, a band is split time-wise into sequential time slices or time slots. Each user of a channel is provided with a time slice for transmitting and receiving information in a round-robin manner. For example, at any given time t, a user is provided access to the channel for a short burst. Then, access switches to another user who is provided with a short burst of time for transmitting and receiving information. The cycle of "taking turns" continues, and eventually each user is provided with multiple transmission and reception bursts.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time, and code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal. Such communication between base station and mobile terminal or between mobile terminals can be degraded due to channel variations and/or interference power variations. For example, the aforementioned variations can affect base station scheduling, power control and/or rate prediction for one or more mobile terminals.

Many conventional UMTS TDD systems do not support Fast Cell Selection (FCS), which is a highly desirable feature of 3G packet data networks. Thus, there is an unmet need in the art for a system and/or methodology of improving throughput in such wireless network systems.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with performing fast cell selection in a wireless network environment. According to one aspect, a user device can select a serving sector from a list of sectors in its virtual active set (VAS) while communicating with a wireless network employing, for instance, a UMTS TDD communication protocol, and OFDMA communication protocol, an SC-FDMA communication protocol, etc. The serving sector can be different from a nominal sector whose scrambling code the user device employs for transmission on the uplink, which scrambling code can be known to all sectors listed in the VAS for the user device. In this manner, all sectors in whose coverage area the user device is located can be included in the user device's VAS and can receive and demodulate transmissions there from.

According to one or more embodiments, a method of selecting a serving sector for a user device in a wireless communication environment can comprise generating a virtual active set (VAS) in the user device that comprises a list of sectors attempting to receive and demodulate transmission signals from a user device, and selecting one sector from the list of sectors in the VAS as a serving sector. The VAS can comprise a nominal sector with a unique scrambling code that can be employed by the user device for transmissions, and which can be known to all sectors in the VAS to permit such sectors to receive and demodulate (e.g., listen to) user device transmissions. Additionally, the user device can monitor beacon signal strength for all sectors in its VAS and can select the sector with the greatest signal-to-noise ration (SINR) as a serving sector with which to communicate using the nominal sector scrambling code. For example, uplink transmissions can be carried out using the nominal sector's scrambling code, and downlink transmissions can be carried out using sector-specific scrambling for the data transmissions over an HS-DSCH and associated control HS-SCCH. Downlink transmissions over dedicated channels can take place from the nominal sector and, hence, utilizing the nominal sector's scrambling code. The method can further comprise updating the VAS as the user device travels from sector to sector. The wireless communication environment can be at least one of a TDD UMTS wireless communication environment, an OFDMA wireless communication environment, and an SC-FDMA wireless communication environment.

According to another aspect, an apparatus that facilitates fast cell selection by a user device in a wireless network environment can comprise a memory that stores a list of sectors trying to demodulate a transmission from the user device, and a processor, coupled to the memory, that analyzes information related to the list of sectors and selects a serving sector from the list of sectors. The selected sector can be a sector in the list of sectors having the highest beacon channel SINR, as determined by a beacon channel analyzer, in order to mitigate an undesirable ping-ponging effect between sectors. Additionally, the list of sectors can comprise a nominal sector whose scrambling code the user device can employ for communication, as well as one or more other sectors in whose coverage areas the user device is located. As the user device travels in and out of individual sector's coverage areas, the list of sectors can be dynamically updated. All sectors listed in the list of sectors can know the user device's scrambling code as well as any other resources assigned thereto by the nominal sector (e.g., time slots, channels, etc.) to permit demodulation of signals transmitted from the user device, as well as transmission to the user device if/when a given sector is selected by the user device as a serving sector. The wireless communication environment can be TDD UMTS, OFDMA, SC-FDMA, or any other suitable wireless communication environment.

According to yet another aspect an apparatus that facilitates fast cell selection by a user device in a wireless communication environment can comprise means for generating a virtual active set (VAS) for the user device, the VAS comprises a list of sectors capable of communicating with the user device, means for updating the VAS as the user device traverses coverage areas of a plurality of sectors, and means for dynamically selecting a sector with a greatest beacon channel SINR as a serving sector. The apparatus can further comprise means for analyzing the beacon channel SINR of each sector in the VAS to determine the sector with the greatest beacon channel SINR, as well as means for providing all sectors listed in the VAS with information related to a scrambling code used by the user device and time slots during which the user device transmits communication signals with the scrambling code. In this manner, all sectors in the user device's VAS can receive and demodulate user device transmissions even though such transmissions do not employ a particular sector's scrambling code, which in turn permits the user device to select any sector in its VAS for data communication. The wireless communication environment can be at least one of a TDD UMTS wireless communication environment, an OFDMA wireless communication environment, and an SC-FDMA wireless communication environment.

According to yet another aspect, a computer-readable medium having stored thereon computer-executable instructions for generating a list of sectors in which a user device is located, updating the list of sectors as the user device traverses sectors, monitoring a beacon channel SINR for each sector listed in the list of sectors, and selecting a sector with a highest SINR from the list of sectors as a serving sector over which data and control commands will be transmitted to the user device. Such instructions can further comprise providing to all sectors in the list of sectors, through a controller, information relating to a scrambling code employed by the user device during transmissions from the user device, to permit all sector in the list of sectors to receive and demodulate transmissions from the user device. The wireless communication environment can be TDD UMTS, OFDMA, SC-FDMA, or any other suitable wireless communication environment.

According to another aspect, processor is described that executes instructions for performing fast cell selection in a communication environment the instructions comprising generating a sector list comprising the identities of sectors in which a user device is located, updating the sector list as the user device traverses sectors, monitoring a beacon channel SINR for each sector listed in the sector list, and selecting a sector with a highest SINR from the sector list as a serving sector over which data and control commands will be transmitted to the user device. The processor can further comprise instructions for providing to all sectors in the sector list, through a controller, information relating to a scrambling code employed by the user device during transmissions from the user device, to permit all sector in the sector list to receive and demodulate transmissions from the user device. Additionally, the processor can comprise instructions for updating the sector list as the user device enters and leaves different sector coverage areas and for selecting a new serving sector when a sector in the sector list is determined to have a greater beacon channel SINR than a current serving sector. The wireless communication environment can be at least one of a TDD UMTS wireless communication environment, an OFDMA wireless communication environment, and an SC-FDMA wireless communication environment.

Still another aspect relates to a mobile device that facilitates communicating over a wireless network, the mobile device comprising a processor that generates a virtual active set (VAS) comprising a list of sectors in which the mobile device is located, updates the VAS as the mobile device traverses a plurality of sectors, and includes in the VAS a nominal sector with a unique scrambling code that is employed by the user device for transmissions from the user device, a memory that stores the VAS, and a beacon channel SINR analyzer that evaluates beacon channel strength from each sector in the VAS and provides such information to the processor, wherein the processor selects the sector in the VAS with the strongest beacon channel as a serving sector for data transmission to the user device. The wireless communication environment can be at least one of a TDD UMTS, an OFDMA, and an SC-FDMA wireless communication environment.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
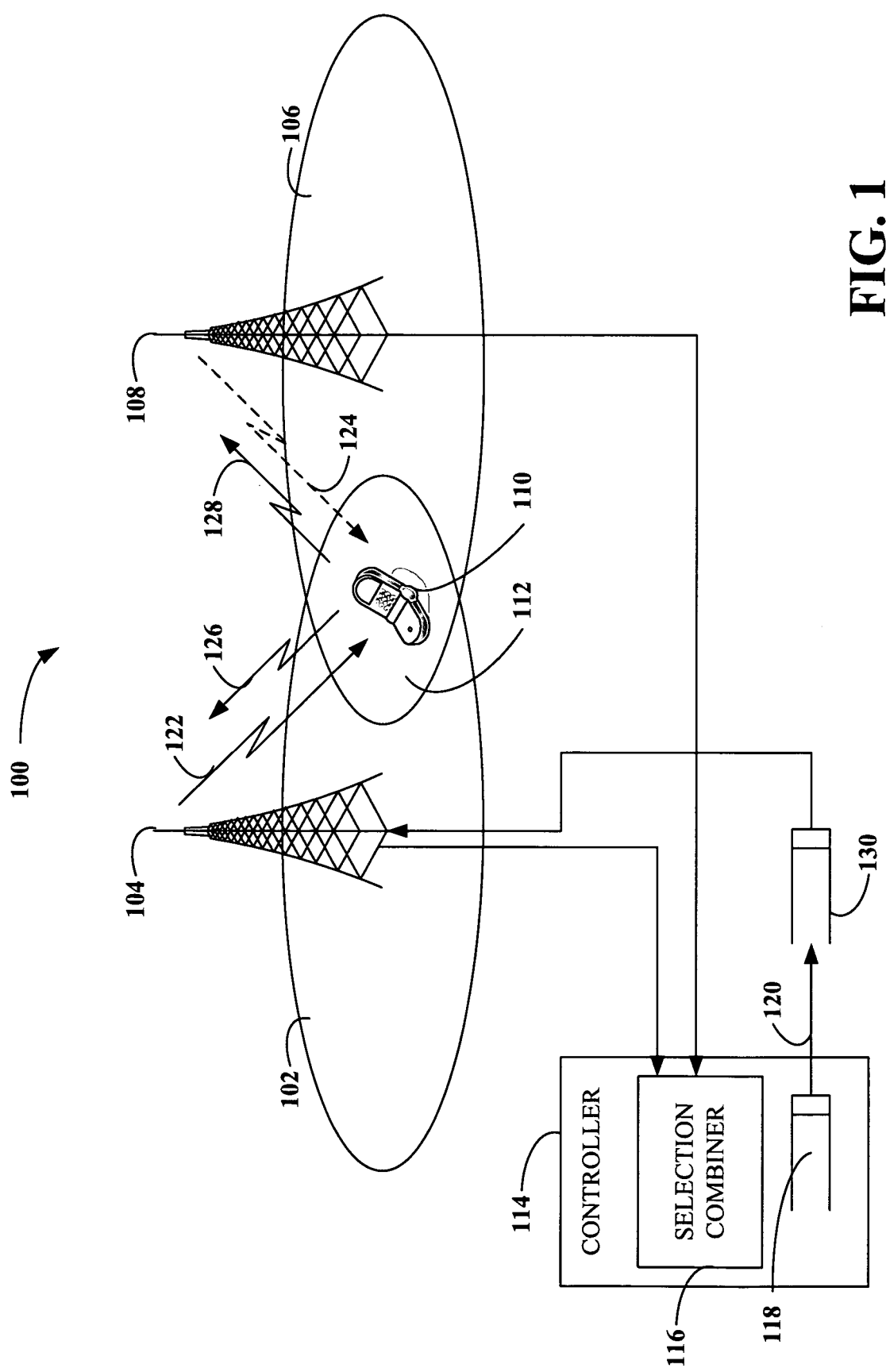
FIG. 1 illustrates a system wherein fast cell selection (FCS) is enabled in an evolution data only (EvDO) wireless communication environment.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a subscriber station. A subscriber station can also be called a system, a subscriber unit, mobile station, mobile, remote station, access point, base station, remote terminal, access terminal, user terminal, user agent, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

It will be understood by those skilled in the art, that although aspects described herein are presented primarily with regard to TDD UMTS systems, such aspects are applicable to other systems with sector-specific resource allocations for uplink communication. Examples of such systems are Orthogonal Frequency Division Multiple Access (OFDMA) and Single Carrier Frequency Division Multiple Access (SC-FDMA). The uplink resources for those systems may be time slots, set(s) of subcarriers (tones) on each time slot, a cell- or sector-specific scrambling code, etc. Accordingly, a user device can use resources that have been allocated for it on its nominal sector. The notion of virtual active set (VAS) described for various UMTS-TDD embodiments is common to those systems, and therefore all the sectors in a user device VAS can attempt to receive and demodulate the user device waveform by virtue of their shared knowledge of the resources used. The user device indication of the downlink serving cell can be conveyed using the uplink waveform characteristics (e.g. scrambling code) and resources allocated by the user device nominal sector.

According to various aspects, systems and methods that facilitate Fast Cell Selection in UMTS TDD systems are described herein. Additionally, such systems and methods apply to the low chip rate (LCR) as well as the high chip rate (HCR) versions of UMTS TDD. Referring now to FIG. 1, a system 100 is illustrated wherein fast cell selection (FCS) is enabled in an evolution data only (EvDO) wireless communication environment. A first sector 102 in a first base station 104 is illustrated with a coverage area that overlaps with a second sector 106 in a second base station 108. The first base station 104 and the second base station 108 may or may not be the same base station. A user device 110 is shown in the overlapping area 112. This area is the soft-handoff region in the case where the first base station 104 is different than the second base station 108, or is the softer-handoff region in case where the first base station 104 is the same as the second base station 108. Accordingly, both first sector 102 and second sector 106 are in an active set of user device 110. In case the first base station 104 and the second base station 108 are different base stations, a base station controller 114 is illustrated with a selection combiner 116 that combines uplink traffic from base stations 104 and 108. Additionally, controller 114 comprises a queue 118 that temporarily stores data packets for transmission on the downlink. It will be noted that controller 114 is associated with a queue 118, and base station 104 (e.g., the transmitting base station in this illustration) is associated with a queue 130. Downlink data 120 is transmitted from queue 118 to queue 130 to base station 104, which in turn transmits data to user device 110. Downlink information 122 can be transmitted from base station 104 to user device 110, and can comprise downlink data, uplink power control information, and reverse activity information. It will be appreciated that base station 108 can transmit a signal 124 comprising power control information and reverse activity information as well, but does not transmit downlink data. User device 110 can communicate with base stations 104 and 108 by transmitting uplink signals 126 and 128, respectively, which can comprise data as well as serving cell information. It will be appreciated that signals 126 and 128 can be identical (e.g., can be a single signal transmitted to both base stations 104 and 108).

On the downlink of a conventional system EvDO, a single sector (e.g., sector 102) is the "serving sector" while the user device's uplink transmissions are demodulated and decoded by all the sectors in the user device's active set. Since the user device's transmissions on the uplink are demodulated and decoded by all the sectors in the user device's active set, user device 110 may select any of those sectors as the "serving sector". In EvDO, the pointing operation is performed by way of the download rate control (DRC) cover. Therefore, a change in the DRC cover in EvDO implies a change of serving sector, which can involve de-queuing and queuing packets at the sectors' transmit buffers. An abandoned sector will de-queue that user device from its transmit buffer and the new serving sector will queue the user device's data into its transmit buffer. The de-queuing/queuing operation may be carried out faster or slower depending on the implementation. For example, packet data queues can be retained at the controller and a replica thereof at the serving sector. If a new sector is chosen, the new sector's queue can be filled out from the controller 114 or from the old serving sector as the old serving sector may be geographically collocated with the new serving sector (e.g., if both sectors belong to the same cell site). Two delays, namely, SoftHandoffDelay and SofterHandoffDelay can be employed to give the user device 110 an estimate of the "cost" (in time) to change serving sector. Such estimate values can be used by the user device's re-pointing algorithm to select an adequate hysteresis governing the algorithm.

Thus, FIG. 1 shows the transmission and reception of downlink and uplink waveforms in an EvDO system. As can be seen from the figure, just one sector (sector 102) sends traffic data on the downlink for a given user. However, all the sectors in the active set will send uplink power control commands in their respective downlink transmissions to power control the user device's transmit power to an effective PER of 1% at the output of the selection combiner 116 of the controller 114. Additionally, user packet data queues 118 and 130 are present in the both controller 114 and serving sector 102, respectively. Thus, the cost of changing serving sector in an EvDO system, for example, from sector 102 to sector 106, includes filling a new queue for user device 110.

Figure 2:
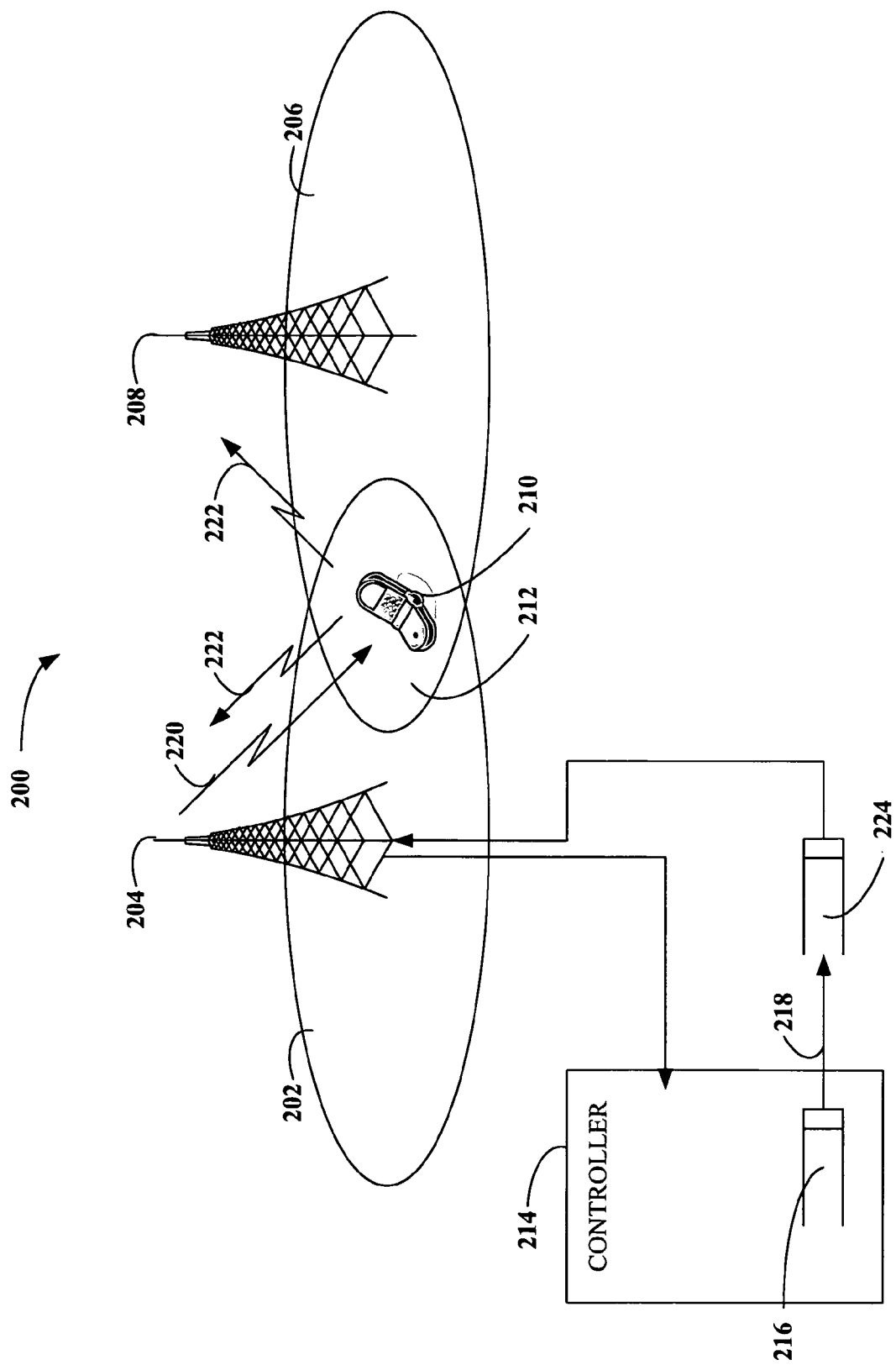
FIG. 2 is an illustration of a system for cell reselection in a UMTS TDD communication environment.

FIG. 2 is an illustration of a system 200 for cell reselection in a UMTS TDD communication environment. A first network sector 202 is depicted in a first base station 204, and which overlaps with a second network sector 206 in a second base station 208. A user device 210 is shown in a region 212 where sectors 202 and 206 overlap. According to the figure, sector 202 is the serving sector for user device 210, and thus transmits uplink data to a controller 214, which comprises a queue 216 similar to the queue described with regard to FIG. 1. Controller 214, via queue 216, transmits on the downlink packet data 218 to another queue 224 associated with sector 202 and/or base station 204. Downlink information is then transmitted from the serving sector base station 204 to user device 210 via a signal 220 comprising downlink data as well as uplink power control information. User device 210 can then transmit information on the uplink 222, which data can be transmitted with serving sector-specific scrambling code. Thus, although signal 222 is illustrated as being transmitted to both base station 204 and base station 208, only base station 204 (e.g., the serving sector base station) will decode the uplink data transmission.

The main characteristic of the transmission and reception in a UMTS TDD system is the scrambling code used for the transmission of data to and from a user device. These codes are typically of length 16 chips and fully define a sector, such that each sector in the system can have a unique scrambling code assigned for its transmissions. Thus, the same scrambling code used for downlink transmissions from sector 202 can be used by user device 210 for its transmissions.

As can be seen in FIG. 2, there is a single link in the downlink and in the uplink connecting the network side with user device 210 at a given time. Such is true despite the fact that user device 210 is in the coverage area of both sectors 202 and 206. In such a conventional UMTS system, there is typically no soft handoff on the uplink (contrary to the EvDO system), and there is also typically no multi-sector power or rate control for the adjustment of the user device's transmit power or rate. The sector from which the scrambling code is used for transmission can be denoted as the "nominal sector," which is the only relevant sector for the user device 210 in a typical UMTS TDD communication environment. Advanced multi-user detection (AMUD) can enable the reception of user device transmissions by sectors other than the nominal sector. Additionally, sectors with scrambling code different from that used by the user device 210, but which still attempt to receive and demodulate the user device's waveform, can be designated as "AMUD sectors". The notion of a virtual active set (VAS) is reciprocal in the sense that all the sectors in the VAS of a given user device are expected to attempt to receive and demodulate the transmissions from that user device. Similarly, the user device is expected to attempt reception of transmissions from all the sectors in its VAS.

Figure 3:
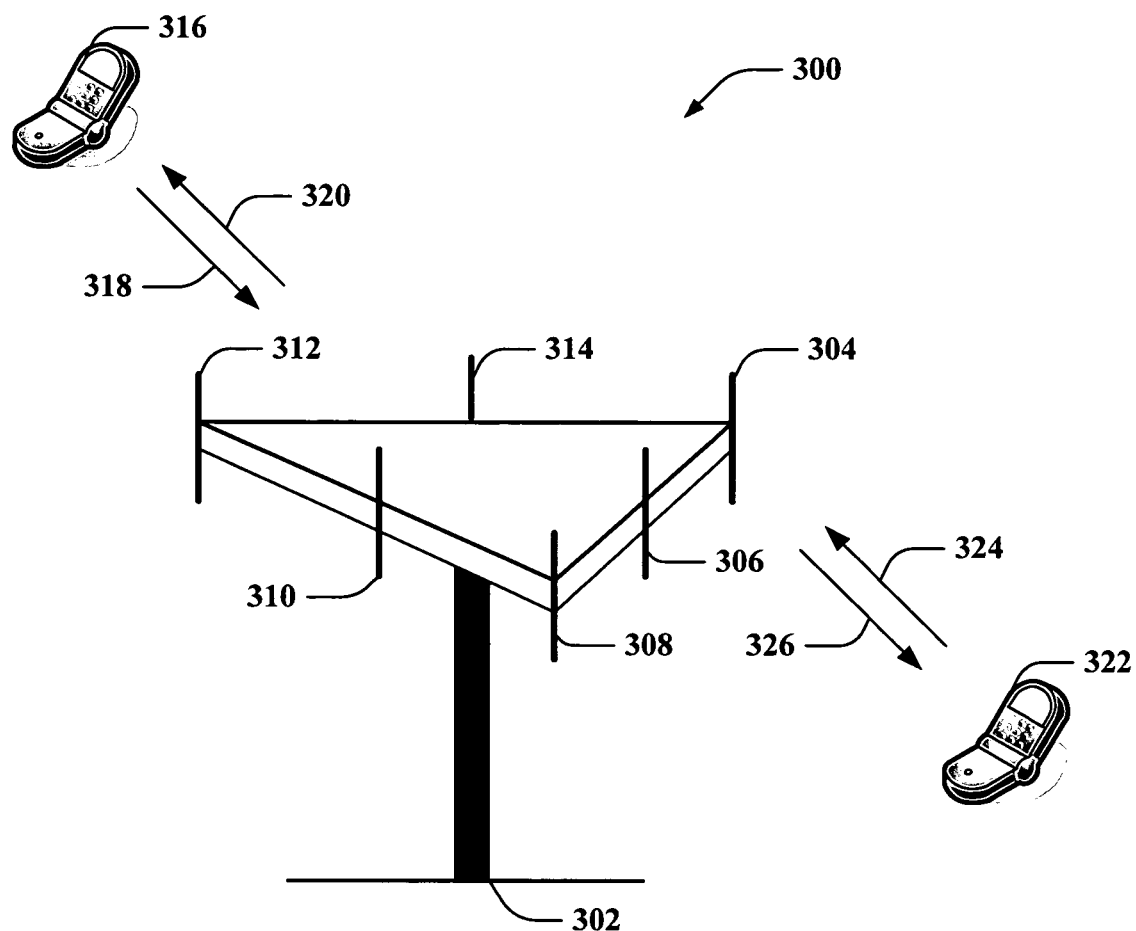
FIG. 3 is an illustration of a multiple access wireless communication system, according to one or more embodiments.

FIG. 3 is an illustration of a multiple access wireless communication system 300, such as can be employed in conjunction with one or more embodiments set forth herein. A 3-sector base station 302 includes multiple antenna groups, one including antennas 304 and 306, another including antennas 308 and 310, and a third including antennas 312 and 314. According to the figure, only two antennas are shown for each antenna group, however, more or fewer antennas may be utilized for each antenna group, sets of receive and transmit antennas need not be equal in number. For example, a particular sector or cell can employ two receive antennas and one transmit antenna, or vice versa, or three transmit antennas and two receive antennas, etc. Additionally, sectors need not have equal numbers of antennas with respect to each other. For instance, a first sector can employ 2 receive antennas and two transmit antennas, a second sector can employ two receive antennas and one transmit antenna, a third sector can employ one receive antenna and one transmit antenna, and so on, such that any permutation of number and type of transmit and/or receive antennas can be employed by a given sector as will be appreciated by one skilled in the art.

Mobile device 316 is in communication with antennas 312 and 314, where antennas 312 and 314 transmit information to mobile device 316 over forward link 320 and receive information from mobile device 316 over reverse link 318. Mobile device 322 is in communication with antennas 304 and 306, where antennas 304 and 306 transmit information to mobile device 322 over forward link 326 and receive information from mobile device 322 over reverse link 324.

Each group of antennas and/or the area in which they are designated to communicate is often referred to as a sector of base station 302. In the illustrated embodiment, antenna groups are designed to communicate to mobile devices in a sector of the areas covered by base station 302. In communication over forward links 320 and 326, the transmitting antennas of base station 302 can utilize beam-forming techniques in order to improve the signal-to-noise ratio of forward links for the different mobile devices 316 and 322. Additionally, a base station using beam-forming to transmit to mobile devices scattered randomly through its coverage area causes less interference to mobile devices in neighboring cells/sectors than a base station transmitting through a single antenna to all mobile devices in its coverage area. A base station may be a fixed station used for communicating with the terminals and may also be referred to as an access point, a Node B, or some other terminology. A mobile device may also be called a mobile station, user equipment (UE), a wireless communication device, terminal, access terminal, user device, or some other terminology. A user device, as described herein can be, for example, a cellular phone, a smartphone, a laptop, a PDA, a handheld communication device, a handheld computing device, a satellite radio, a global positioning system, or any other suitable device for communicating over a wireless network, as will be appreciated by one skilled in the art.

Figure 4:
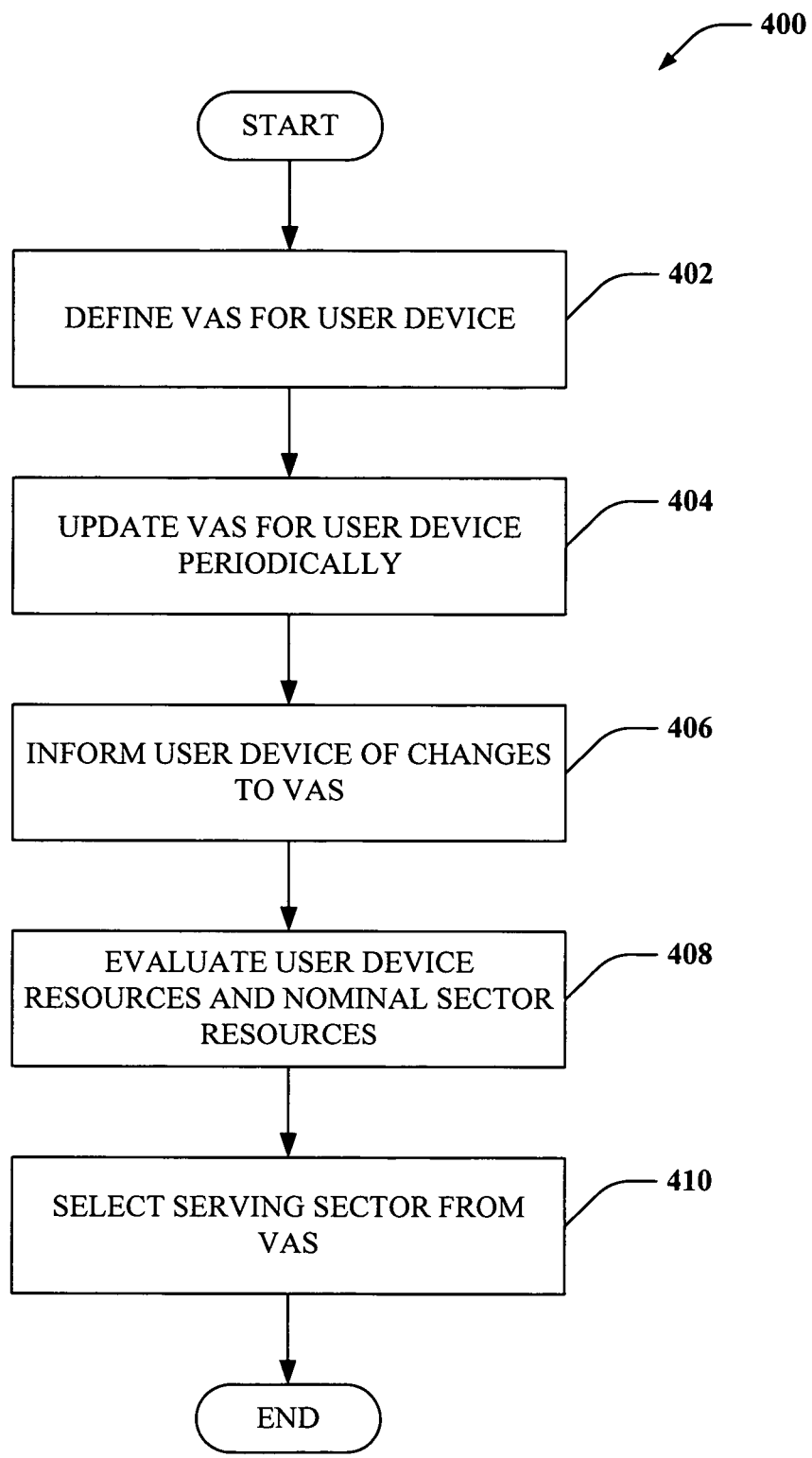
FIG. 4 is an illustration of a methodology for enabling fast cell selection (FCS) in UMTS TDD wireless communication environment using a virtual active set (VAS), in accordance with one or more aspects.
Figure 5:
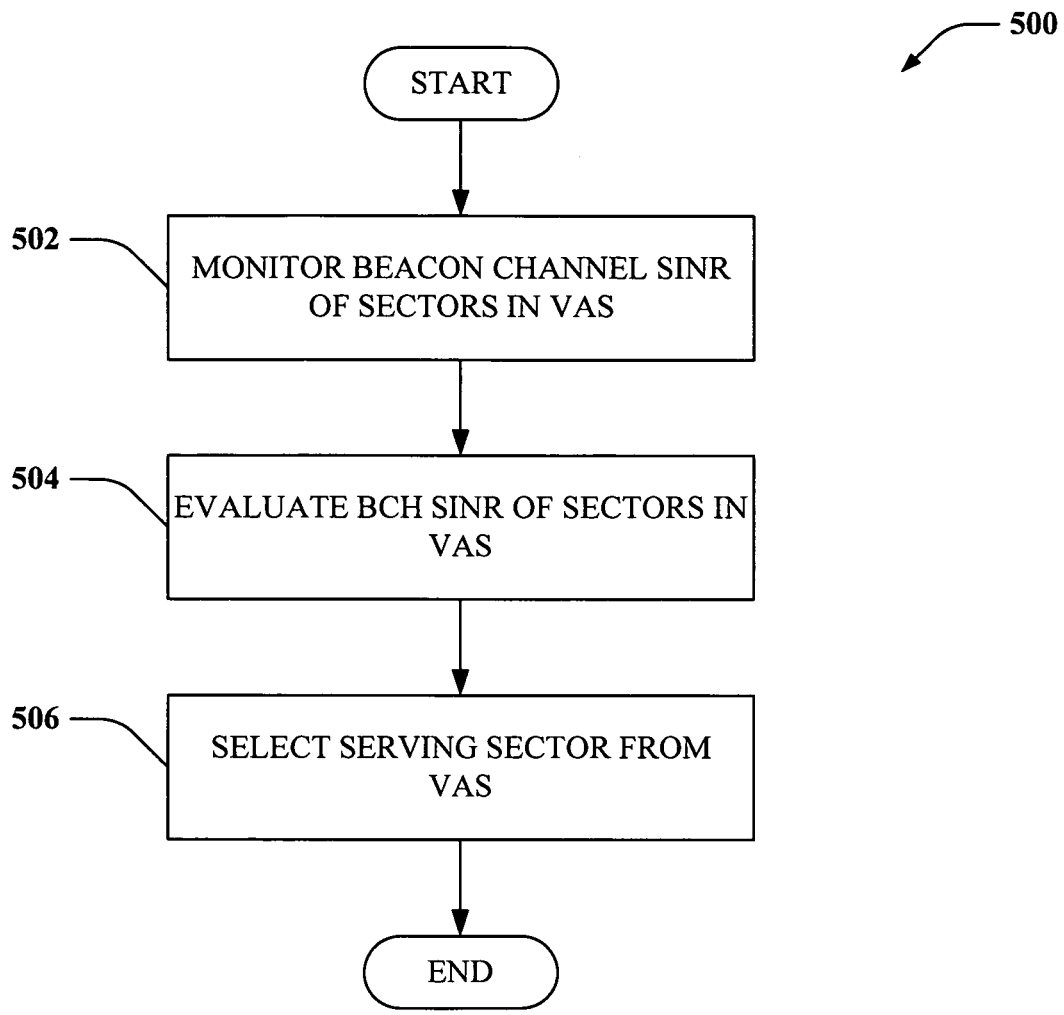
FIG. 5 is an illustration of a methodology that facilitates selecting a serving sector from a VAS, in accordance with one or more aspects.
Figure 6:
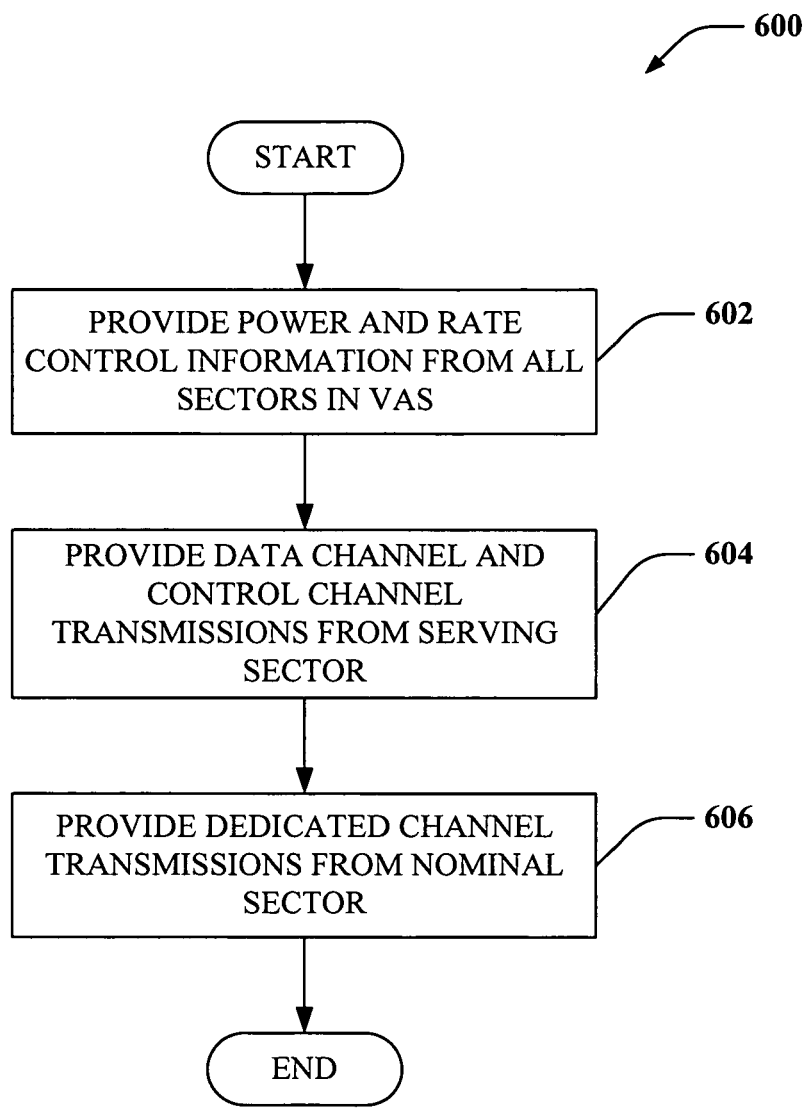
FIG. 6 illustrates a methodology for providing information to a user device to facilitate selecting a serving sector from a VAS associated with the user device, in accordance with one or more embodiments.

Referring to FIGS. 4-6, methodologies relating to generating a VAS and/or supporting fast cell selection in a wireless communication environment are illustrated. For example, methodologies can relate to performing fast cell selection in a UMTS TDD wireless environment, an OFDM environment, an OFDMA environment, a CDMA environment, a TDMA environment, a TDD environment, an SDMA environment, or any other suitable wireless environment. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

FIG. 4 is an illustration of a methodology 400 for enabling fast cell selection (FCS) in UMTS TDD wireless communication environment using a virtual active set (VAS), in accordance with one or more aspects. At 402, the VAS for a user device can be defined as a list of sectors that attempt to demodulate and decode transmissions from the user device, and can be known at the network side as well as at the user device. At 404, the VAS can be updated over time with measurements, from the network side, based in part on a capability of a given sector to continue demodulating the user device's waveform (e.g., whether the user device is within range of a given base station, etc.). Communication between the sectors (e.g., base stations, NodeBs, etc.) and a controller (RNC) facilitates maintaining an up to date VAS for all the user devices in the system (e.g., as in EvDO systems). When there is a change in the user device's VAS, the network can inform the user device about it through signaling over the serving sector, at 406.

Additionally, all the sectors in the VAS of a user device can be aware of the specific channels allocated to the user device for communication on the downlink and on the uplink. In addition to the channels themselves, the sectors in the VAS can be aware of resources that have been allocated in the "nominal sector" of the user device for communication with that user device. Such knowledge can facilitate determining time slots and codes that may be used for communication to and from the user device, and can be evaluated at 408. At 410, the user device can select a serving sector from the sectors in the VAS of the user device. It will be appreciated that the serving sector selected can be any sector in the VAS, inclusive of the nominal sector. In this manner, the user device may choose the "serving sector" as one of the sectors in its VAS, whereas conventional systems and methods do not permit the user device to choose from other than the sector spreading code the user device employs to communicate (the "nominal sector").

FIG. 5 is an illustration of a methodology 500 that facilitates selecting a serving sector from a VAS in accordance with one or more aspects described herein. It will be appreciated that transmissions from the user device can be performed using its nominal scrambling code (the scrambling code that the user device would use if the VAS notion did not exist), and the resources allocated in its "nominal sector." Accordingly, a regular use of the corresponding HS-SICH can be expected. At 502, the user device can monitor a beacon channel signal-to-interference-noise ratio (SINR) of all the sectors in its VAS. At 504, user device can evaluate and/or compare beacon channel SINRs for all sectors in its VAS to determine which sector has the greatest SINR. In this manner, ping-ponging between sectors can be mitigated and loss of transmission capacity can be avoided. At 506, the user device can select a serving sector from its VAS based at least in part on the SINR strength determined at 504. The procedure to select one out of all the sectors in the user device's VAS can be supported, for example, as part of high-speed shared information channel (HS-SICH) information.

FIG. 6 illustrates a methodology for providing information to a user device to facilitate selecting a serving sector from a VAS associated with the user device, in accordance with one or more aspects set forth herein. At 602, control information for power and rate control can be provided by (e.g., transmitted from) all sectors in the user device's VAS. At 604, data channel (e.g., HS-DSCH) and control channel (e.g., HS-SCCH) transmissions can be provided from a selected serving sector. It will be appreciated that transmission capability for sending control channel information to all user devices that have a particular sector in their VASs can be supported. Thus, when a particular sector is listed in a user device's VAS, the sector will be able to transmit control channel information to the user device. Additionally, all sectors in a user device's VAS can have an identical set of allowed control channels to permit the user device to listen to all sectors without compromising the high-speed shared information channel timing.

At 606, the user device can be provided with dedicated channel transmissions by the nominal sector, using the nominal sector's scrambling code and dedicated resources. Additionally, all sectors in the user device's VAS can receive and attempt to decode transmissions from the user device. All sectors in the user device's VAS can further be aware of channel assignments and resource allocations in the nominal sector of the user device. Upon a change in serving sector for a given user device, the network can dequeue a packet data buffer in the former serving sector and queue such information in the newly selected serving sector (e.g., in a packet data buffer associated therewith).

Figure 7:
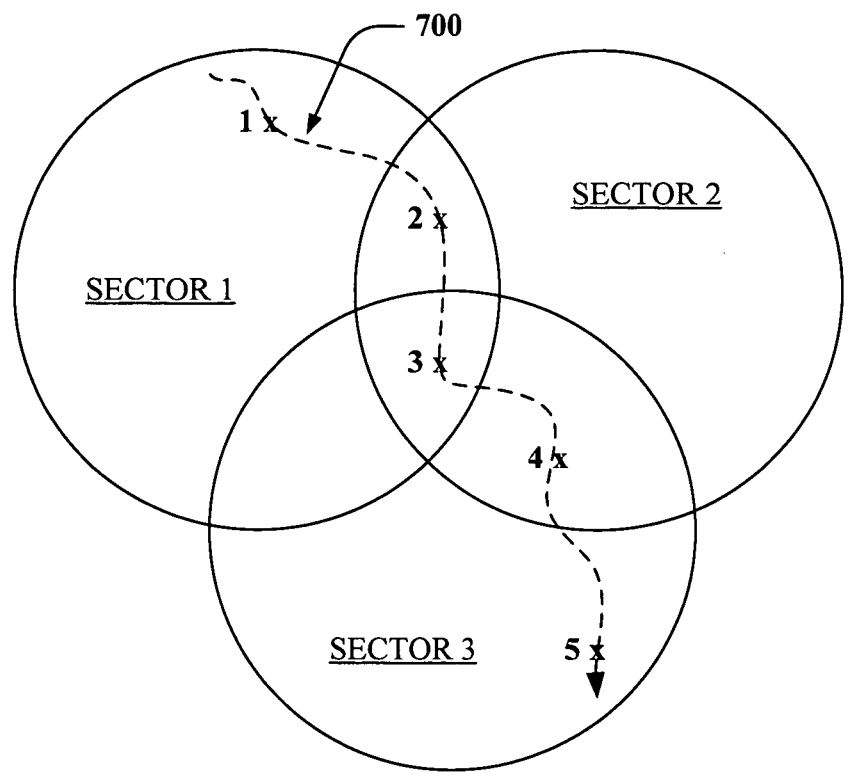
FIG. 7 is an illustration of an exemplary course of a user device across a plurality of coverage areas, in accordance with one or more aspects.

FIG. 7 is an illustration of an exemplary course 700 of a user device across a plurality of coverage areas, in accordance with one or more aspects. A first sector, sector 1, is illustrated as overlapping in coverage area with a second sector, sector 2, and a third sector, sector 3, each of which overlap with the other. Each cross-point in the figure, labeled 1 through 5, represents a different geographical point at which the user device's VAS can be updated. Table 1, below, shows the expected VAS along with nominal sectors for a user device at the different locations:

TABLE 1

| Point # | V-AS | Nominal Sector |
|---|---|---|
| 1 | Sector 1 | Sector 1 |
| 2 | Sectors 1 and 2 | Sector 1 |
| 3 | Sectors 1, 2 and 3 | Sector 1 |
| 4 | Sectors 2 and 3 | Sector 3 |
| 5 | Sector 3 | Sector 3 |

Point 1 is illustrated in sector 1, at which point sector 1 is the only sector in the user device's VAS: thus, sector 1 is the nominal sector and can be selected as the serving sector as well. Point 2 is located in the overlapping coverage areas of sector 1 and sector 2, which will both be included in the user device's VAS at point 2. Either sector can be selected by the user device as the serving sector, based on, for example, analysis of beacon channel SINR strength and the like, although sector 1 is retained as the nominal sector in this example, which can facilitate mitigating a ping-pong effect associated with undesirably frequent sector switching.

Point 3 is shown as being located in the overlapping coverage areas of all three sectors, which are thus listed in the user device's VAS and from which the user device can select a serving sector. Sector 1 is again retained as the nominal sector to mitigate ping-ponging and improve system throughput. At point 4, the user device is located in the overlapping coverage areas of sectors 2 and 3 only. Accordingly, sector 1 is no longer in the user device's VAS, and sector 3 has become the nominal sector. At point 5, the user device has traveled into an area that is covered solely by sector 3: thus, sector 3 is the only sector in the VAS and is retained as the nominal sector. It should be apparent that the nominal sector is always in the VAS of the user device, and that when the VAS contains more than one sector, the user device can select any such sector as a serving sector. Additionally, advanced multi-user detection techniques can be employed by way of a linear block MMSE implementation or by other linear or non-linear adaptive scheme to facilitate interference cancellation, etc.

It will be appreciated that, in accordance with one or more embodiments and/or methods described herein, inferences can be made regarding serving sector selection, nominal sector selection, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or methods presented above can include making inferences regarding a best new sector to select for communication in a wireless environment. For instance, with regard to the path of a user device such as presented in FIG. 7, inferences can be made regarding a direction of travel. Such inferences can be base at least in part on up-to-the-minute triangulation data, such as a global positioning technique or the like, to facilitate inferring where a user device is likely to be located at a future time. According to this example, information related to a route followed by the user device can be employed to infer whether the user device will continue in a given direction. For instance, a user device employed in a vehicle traveling on an interstate highway can have a relatively straight path of movement. In such a case, an inference can be made to select sector 3 as the nominal sector and/or as the serving sector as early as point 3 because historical position data indicates a generally southward displacement for the path of travel.

According to another example, inferences can be made by a region controller regarding which sectors to include in a user's VAS. Such inferences can be based on, for instance, communication traffic in one or more potential VAS sectors, such that a sector experiencing capacity-level traffic can be temporarily excluded from the VAS of a user device at an edge of the sector. In a similar example, a controller can make inferences regarding excluding one or more sectors based on a presence of other sectors with stronger communication capabilities and/or signals at a given time. It will be appreciated that the foregoing examples are illustrative in nature and are not intended to limit the number of inferences that can be made or the manner in which such inferences are made in conjunction with the various embodiments and/or methods described herein.

Figure 8:
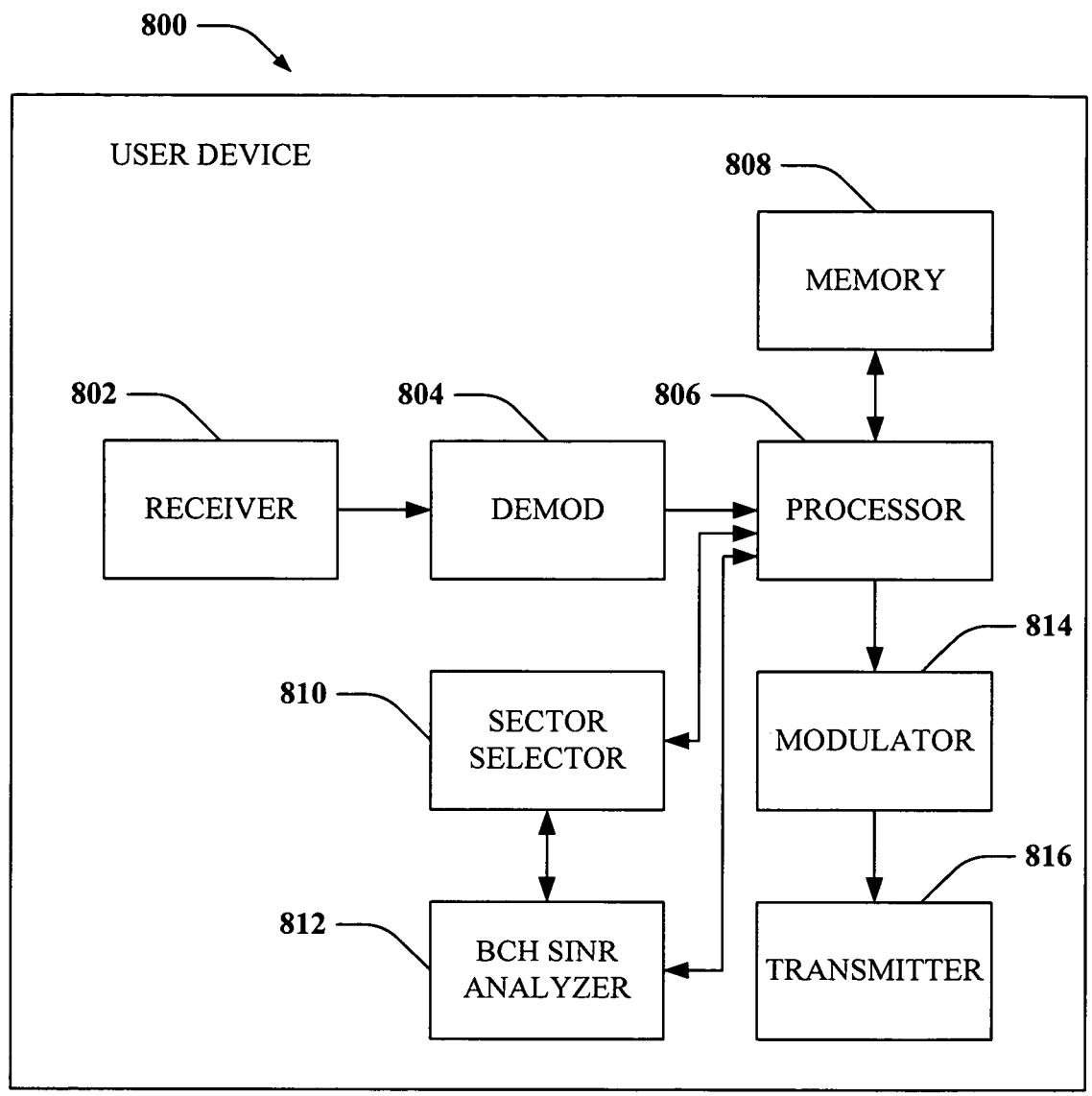
FIG. 8 is an illustration of a user device that facilitates performing fast cell selection in a UMTS TDD wireless communication environment, in accordance with one or more embodiments.

FIG. 8 is an illustration of a user device 800 that facilitates performing fast cell selection in a UMTS TDD wireless communication environment, in accordance with one or more embodiments described herein. User device 800 comprises a receiver 802 that receives a signal from, for instance, a receive antenna, and performs typical actions (e.g., filters, amplifies, downconverts, etc.) on the received signal and digitizes the conditioned signal to obtain samples. A demodulator 804 can obtain received symbols for each symbol period, as well as provide received pilot symbols to a processor 806 for channel estimation.

Processor 806 can be a processor dedicated to analyzing information received by receiver component 802 and/or generating information for transmission by a transmitter 816, a processor that controls one or more components of user device 800, and/or a processor that both analyzes information received by receiver 802, generates information for transmission by transmitter 816 and controls one or more components of user device 800.

User device 800 can additionally comprise memory 808 that is operatively coupled to processor 806 and that stores information related to a VAS of the user device 800, sectors in the VAS, sector selection protocols and/or algorithms, scrambling code information related to a nominal sector for user device 800, or any other suitable information related to performing fast sector selection, as described herein. Memory 808 can additionally store information associated with sector identities, designations (e.g., serving, nominal, AMUD, ...), etc., such that user device 800 can employ stored protocols, algorithms, information to achieve fast cell selection as described herein. Still furthermore, memory 808 can be updated over time with measurements from the network side regarding the ability of a given sector (e.g., base station) to continue demodulating signals from user device 800. For example, a controller (not shown), can maintain an up-to-date VAS for each user device in a network, and can update memory 808 through a current serving sector for user device 800. Additionally, controller can provide all sectors in a user device's 800 VAS with information related to channels allocated to user device 800, as well as resources allocated to the nominal sector to facilitate communication between user device 800 and a serving sector while employing a scrambling code assigned to the nominal sector, etc.

It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory.

Processor 806 is further coupled to a sector selector 810 that can facilitate sector selection based at least in part on information stored in memory 808 and/or information received and processed by processor 806. Sector selector 810 can be operatively associated with a beacon channel SINR analyzer 812, which can also be coupled to processor 806, and which can evaluate signal strength for one or more sectors included in the VAS stored in memory 808 of user device 800. Based on SINR analysis, sector selector 810 can select a best-fit sector as a serving sector with which to communicate. User device 800 still further comprises a symbol modulator 814 and a transmitter 816 that transmits the modulated signal using a scrambling code associated with the nominal sector used by user device 800, as set forth with regard to the preceding figures. In this manner, user device 800 can select a serving sector from the list of sectors in the VAS stored in memory 808, wherein the serving sector need not be the nominal sector, in order to achieve fast cell selection in a UMTS TDD communication environment.

Figure 9:
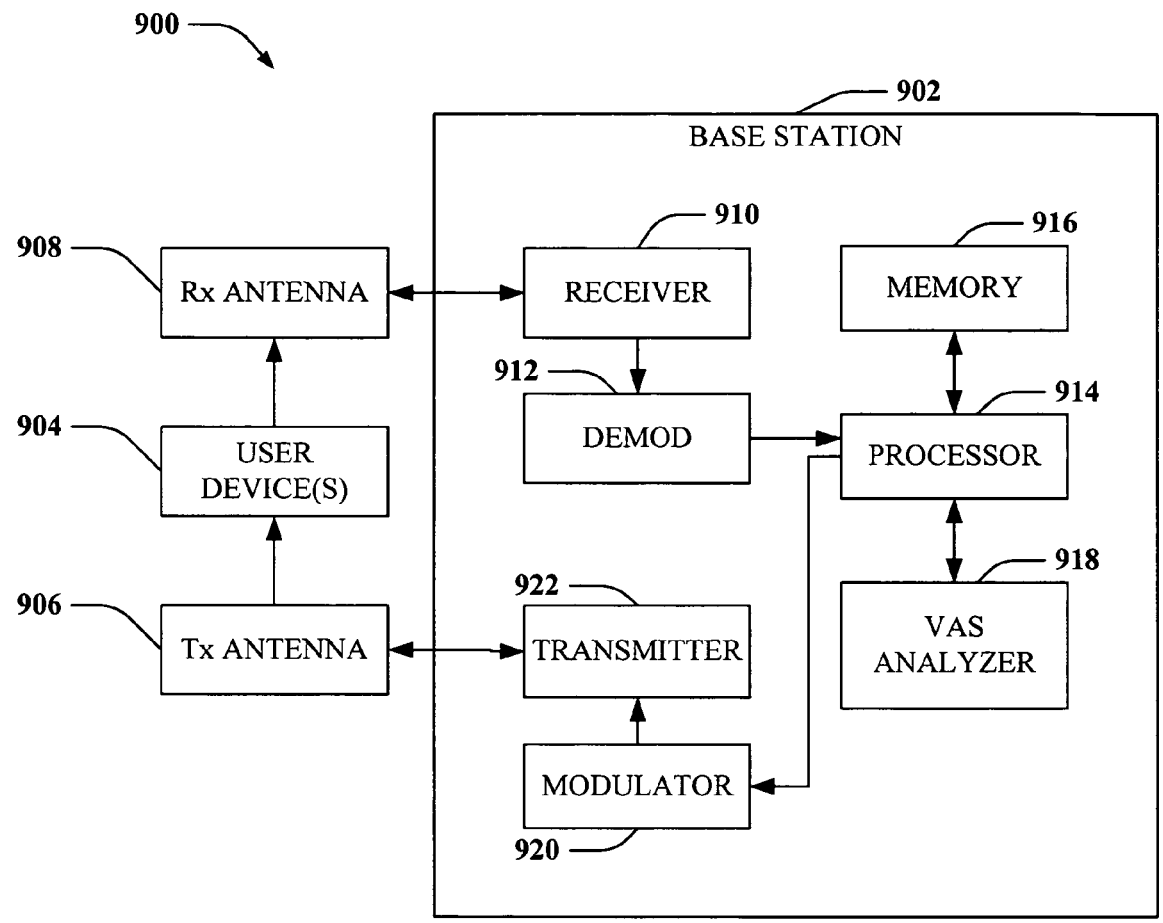
FIG. 9 is an illustration of a system that facilitates fast cell selection in a UMTS TDD wireless communication environment, in accordance with one or more aspects.

FIG. 9 is an illustration of a system 900 that facilitates fast cell selection in a UMTS TDD wireless communication environment in accordance with one or more aspects set forth herein. System 900 comprises a base station 902 that communicates with one or more user devices 904 via a transmit antenna 906 and a receive antenna 908, although more than one transmit and receive antenna can be employed in conjunction with various aspects. Base station 902 comprises a receiver 910 that receives information from receive antenna 908 and is operatively associated with a demodulator 912 that demodulates received information. Demodulated symbols can be analyzed by a processor 914 that is similar to the processor described above with regard to FIG. 8, and which is coupled to a memory 916 that stores information related to user devices, 904, a VAS for each user device 904, sector identities in each VAS, including a nominal sector, a serving sector, and any AMUD sectors in each VAS, along with scrambling codes for such sectors, time slot information and the like, resource allocations, and/or any other suitable information related to permitting a user device to perform a fast cell selection as described herein.

Processor 914 is further coupled to a VAS analyzer 918 that can process information related to user device VASs, updates thereto, resources allocated to user devices 904 and/or sectors listed in each user device's VAS in which base station 902 is listed, etc., to permit a modulator 920 and/or transmitter 922 in base station 902 to appropriately modulate and transmit a communication signal to user device 904 via transmit antenna 906. Based on such information, base station 902 can transmit to user device 904 using its associated scrambling code and by way of common physical channel resources (e.g., HS-SCCH and HS-PDSCH).

It will be appreciated that base station 902 can be a serving station, a nominal station, or an AMUD station in the one or more user device's 904 VAS at any given point in time, and can switch there between upon an indication from a controller (not shown) and/or upon selection as a serving sector base station by a user device. Additionally, base station 902 can attempt to receive and decode signals from all user devices 904 with VASs in which base station 902 is listed. Furthermore, all such base stations in all AMUD sectors listed in a VAS can have knowledge of channel assignments and resource allocations in the nominal sector of a particular user device for each such AMUD sector.

Figure 10:
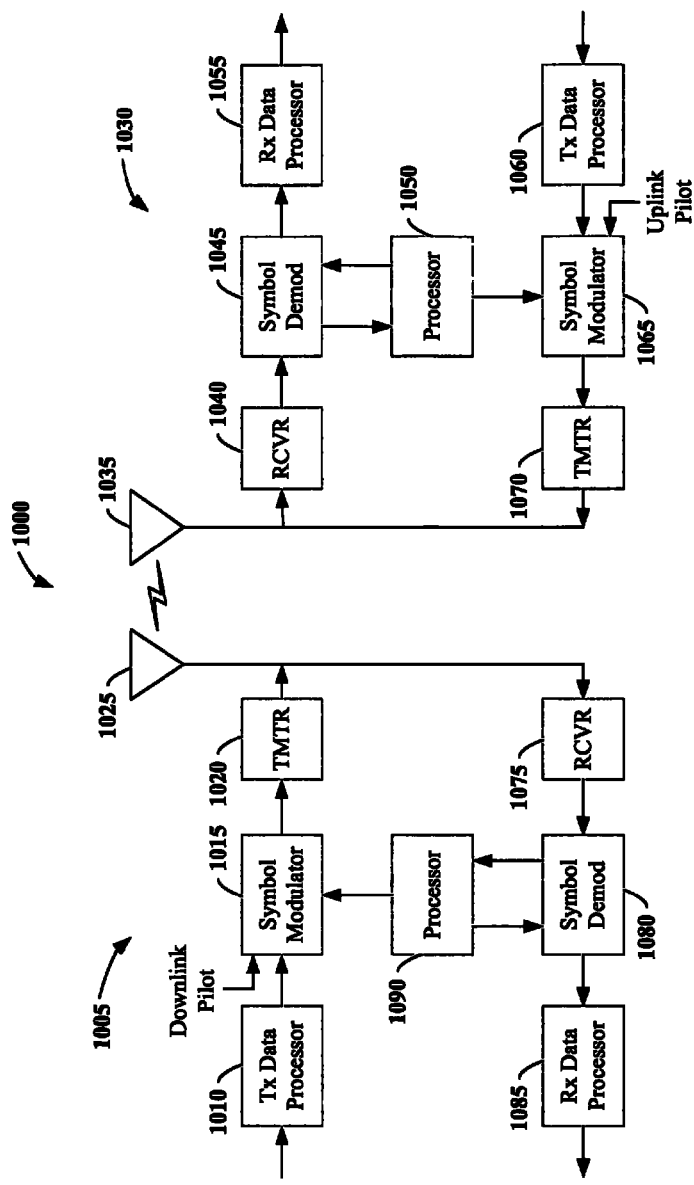
FIG. 10 is an illustration of a wireless network environment that can be employed in conjunction with the various systems and methods described herein.

FIG. 10 shows an exemplary wireless communication system 1000. The wireless communication system 1000 depicts one base station and one terminal for sake of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the systems (FIGS. 8-9) and/or methods (FIGS. 4-7) described herein to facilitate wireless communication there between.

Referring now to FIG. 10, on a downlink, at access point 1005, a transmit (TX) data processor 1010 receives, formats, codes, interleaves, and modulates (or symbol maps) traffic data and provides modulation symbols ("data symbols"). A symbol modulator 1015 receives and processes the data symbols and pilot symbols and provides a stream of symbols. A symbol modulator 1020 multiplexes data and pilot symbols and provides them to a transmitter unit (TMTR) 1020. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1020 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1025 to the terminals. At terminal 1030, an antenna 1035 receives the downlink signal and provides a received signal to a receiver unit (RCVR) 1040. Receiver unit 1040 conditions (e.g., filters, amplifies, and frequency downconverts) the received signal and digitizes the conditioned signal to obtain samples. A symbol demodulator 1045 demodulates and provides received pilot symbols to a processor 1050 for channel estimation. Symbol demodulator 1045 further receives a frequency response estimate for the downlink from processor 1050, performs data demodulation on the received data symbols to obtain data symbol estimates (which are estimates of the transmitted data symbols), and provides the data symbol estimates to an RX data processor 1055, which demodulates (i.e., symbol demaps), deinterleaves, and decodes the data symbol estimates to recover the transmitted traffic data. The processing by symbol demodulator 1045 and RX data processor 1055 is complementary to the processing by symbol modulator 1015 and TX data processor 1010, respectively, at access point 1005.

On the uplink, a TX data processor 1060 processes traffic data and provides data symbols. A symbol modulator 1065 receives and multiplexes the data symbols with pilot symbols, performs modulation, and provides a stream of symbols. A transmitter unit 1070 then receives and processes the stream of symbols to generate an uplink signal, which is transmitted by the antenna 1035 to the access point 1005.

At access point 1005, the uplink signal from terminal 1030 is received by the antenna 1025 and processed by a receiver unit 1075 to obtain samples. A symbol demodulator 1080 then processes the samples and provides received pilot symbols and data symbol estimates for the uplink. An RX data processor 1085 processes the data symbol estimates to recover the traffic data transmitted by terminal 1035. A processor 1090 performs channel estimation for each active terminal transmitting on the uplink. Multiple terminals may transmit pilot concurrently on the uplink on their respective assigned sets of pilot subbands, where the pilot subband sets may be interlaced.

Processors 1090 and 1050 direct (e.g., control, coordinate, manage, etc.) operation at access point 1005 and terminal 1030, respectively. Respective processors 1090 and 1050 can be associated with memory units (not shown) that store program codes and data. Processors 1090 and 1050 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1090 and 1050.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of selecting a serving sector for a user device employing a first scrambling code in a wireless communication environment, the method comprising:
   generating a virtual active set (VAS) in the user device that comprises a list of sectors attempting to receive and demodulate transmission signals from the user device based at least in part on knowledge of the first scrambling code, wherein the list of sectors comprises a sector assigned the first scrambling code and an advanced multi-user detection (AMUD) sector assigned a second scrambling code, and wherein the first and second scrambling codes are different;
   evaluating a beacon signal strength from each sector in the VAS;
   determining, by the user device, a sector with a highest signal-to-interference-plus-noise ratio (SINR) of the sectors in the VAS based on the evaluated beacon channel strengths; and
   selecting, by the user device, a sector from the list of sectors in the VAS as the serving sector based at least in part on the determined sector with the highest SINR, wherein the first scrambling code comprises a scrambling code of the nominal sector, which is employed by the user device, and is provided to all other sectors listed in the user device's VAS.

2. The method of claim 1, further comprising the user device receiving resource assignments from a nominal sector of the VAS for transmission of signals from the user device.

3. The method of claim 2, further comprising the user device transmitting signals, employing the first scrambling code associated with the resource assignments, during time slots associated with the resource assignments.

4. The method of claim 1, wherein the AMUD sector comprises one or more base stations that attempt to receive and demodulate transmissions from the user device using an AMUD sector technique.

5. The method of claim 1, wherein information related to resources assigned to the user device is known to all other sectors listed in the user device's VAS.

6. The method of claim 5, wherein all sectors in the user device's VAS are permitted to attempt to receive and demodulate transmissions from the user device based at least in part on knowledge of assigned resources employed by the user device to transmit a signal.

7. The method of claim 2, wherein the resources comprise a transmission channel and time slots for transmission.

8. The method of claim 1, further comprising the user device employing the serving sector for downlink data channel transmissions and control channel transmissions.

9. The method of claim 1, further comprising updating the VAS upon detection of one or more new sectors attempting to receive and demodulate transmissions from the user device.

10. The method of claim 9, wherein the updating further comprises updating the VAS as the user device travels into the new sector.

11. The method of claim 1, the wireless communication environment is a TDD UMTS wireless communication environment.

12. The method of claim 1, the wireless communication environment is at least one of an OFDMA wireless communication environment and an SC-FDMA wireless communication environment.

13. An apparatus in a user device employing a first scrambling code, which facilitates fast cell selection in a wireless communication environment, the apparatus comprising:
a memory that stores a virtual active set (VAS) comprising a list of sectors trying to demodulate a transmission from the user device based at least in part on knowledge of the first scrambling code, wherein the list of sectors comprises a sector assigned the first scrambling code and an advanced multi-user detection (AMUD) sector assigned a second scrambling code, and wherein the first and second scrambling codes are different;
a beacon channel analyzer that evaluates a signal-to-interference-plus-noise ratio (SINR) for a beacon channel associated with each sector in the list of sectors;
a sector selector that determines a strongest beacon channel SINR;
a processor, coupled to the memory, that selects a serving sector from the VAS based at least in part on the strongest beacon channel SINR determined by the sector selector, wherein the first scrambling code comprises a scrambling code of the nominal sector, which is employed by the user device, and is provided to all other sectors listed in the user device's VAS.

14. The apparatus of claim 13, wherein the list of sectors further comprising a nominal sector that allocates communication resources and the first scrambling code to the user device for transmissions from the user device.

15. The apparatus of claim 14, wherein all sectors in the list of sectors have knowledge of the first scrambling code employed by the user device and resources employed to transmit from the user device, such that all sectors in the list of sectors can attempt to receive and demodulate transmissions from the user device.

16. The apparatus of claim 13, wherein the user device transmits on an uplink using the first scrambling code associated with a nominal sector, the first scrambling code is known to all sectors in the list of sectors to permit such sectors to attempt demodulation of transmissions from the user device.

17. The apparatus of claim 13, wherein the processor updates the list of sectors stored in the memory as the user device enters and/or leaves a sector's coverage area.

18. The apparatus of claim 13, wherein the user device is at least one of a cellular phone, a smartphone, a laptop, a PDA, a handheld communication device, a handheld computing device, a satellite radio, and a global positioning system.

19. The apparatus of claim 13, the user device receives power control commands and rate control commands from all sectors listed in the list of sectors of the user device.

20. The apparatus of claim 13, the wireless communication environment is a TDD UMTS wireless communication environment.

21. The apparatus of claim 13, the wireless communication environment is at least one of an OFDMA wireless communication environment and an SC-FDMA wireless communication environment.

22. An apparatus in a user device employing a first scrambling code, which facilitates fast cell selection in a wireless communication environment, the apparatus comprising:
means for generating a virtual active set (VAS) for the user device, the VAS comprises a list of sectors capable of communicating with the user device based at least in part on knowledge of the first scrambling code, wherein the list of sectors comprises a sector assigned the first scrambling code and an advanced multi-user detection (AMUD) sector assigned a second scrambling code, and wherein the first and second scrambling codes are different;
means for updating the VAS as the user device traverses coverage areas of a plurality of sectors;
means for analyzing a beacon channel signal-to-interference-plus-noise ratio (SINR) of each sector in the VAS to determine the sector with a greatest beacon channel SINR; and
means for dynamically selecting a sector as a serving sector based at least in part on the sector with the greatest beacon channel SINR, wherein the first scrambling code comprises a scrambling code of the nominal sector, which is employed by the user device, and is provided to all other sectors listed in the user device's VAS.

23. The apparatus of claim 22, wherein a sector is capable of communicating with a user device when the user device is in the coverage area of a base station in the sector.

24. The apparatus of claim 23, the means for updating the VAS adds and removes sectors as the user device traverses sector coverage areas.

25. The apparatus of claim 24, wherein all sectors listed in the VAS are provided information related to the first scrambling code used by the user device and time slots during which the user device transmits communication signals with the first scrambling code.

26. The apparatus of claim 22, the wireless communication environment is a TDD UMTS wireless communication environment.

27. The apparatus of claim 22, the wireless communication environment is at least one of an OFDMA wireless communication environment and an SC-FDMA wireless communication environment.

28. A non-transitory computer-readable storage medium having stored thereon computer-executable instructions for:
generating a virtual active set (VAS) comprising a list of sectors attempting to receive and demodulate transmission signals from a user device employing a first scrambling code based at least in part on knowledge of the first scrambling code, wherein the list of sectors comprises a sector assigned the first scrambling code and an advanced multi-user detection (AMU D) sector assigned a second scrambling code, and wherein the first and second scrambling codes are different;

updating the list of sectors as the user device traverses sectors;

monitoring a beacon channel signal-to-interference-plus-noise ratio (SINR) for each sector listed in the list of sectors;

determining a highest SINR from the monitored beacon channel SINRs; and selecting a sector from the list of sectors as a serving sector over which data and control commands will be transmitted to the user device based at least in part on the sector with the highest SINR, wherein the first scrambling code comprises a scrambling code of the nominal sector, which is employed by the user device, and is provided to all other sectors listed in the user device's VAS.

29. The non-transitory computer-readable storage medium of claim 28, further comprising instructions for providing to all sectors in the list of sectors, through a controller, information relating to the first scrambling code employed by the user device during transmissions from the user device, to permit all sector in the list of sectors to receive and demodulate transmissions from the user device.

30. The non-transitory computer-readable storage medium of claim 29, further comprising instructions for updating the list of sectors as the user device enters and leaves different sector coverage areas.

31. The non-transitory computer-readable storage medium of claim 30, further comprising instructions for selecting a new serving sector when a sector in the list of sectors is determined to have a greater beacon channel SINR than a current serving sector.

32. The non-transitory computer-readable storage medium of claim 28, wherein the computer-executable instructions are operable in a TDD UMTS wireless communication environment.

33. The non-transitory computer-readable storage medium of claim 28, wherein the computer-executable instructions are operable in at least one of an OFDMA wireless communication environment and an SC-FDMA wireless communication environment.

34. A processor that executes instructions for performing fast cell selection in a wireless communication environment, the instructions comprising:

generating a virtual active set (VAS) comprising a sector list comprising the identities of sectors attempting to receive and demodulate transmission signals from a user device employing a first scrambling code based at least in part on knowledge of the first scrambling code, wherein the sector list comprises a sector assigned the first scrambling code and an advanced multi-user detection (AMUD) sector assigned a second scrambling code, and wherein the first and second scrambling codes are different;

updating the sector list as the user device traverses sectors;

monitoring a beacon channel signal-to-interference-plus-noise ratio (SINR) for each sector listed in the sector list;

determining a highest SINR from the monitored beacon channel SINRs; and selecting a sector from the sector list as a serving sector over which data and control commands will be transmitted to the user device based at least in part on the sector with the highest SINR, wherein the first scrambling code comprises a scrambling code of the nominal sector, which is employed by the user device, and is provided to all other sectors listed in the user device's VAS.

35. The processor of claim 34, further comprising instructions for providing to all sectors in the sector list, through a controller, information relating to the first scrambling code employed by the user device during transmissions from the user device, to permit all sector in the sector list to receive and demodulate transmissions from the user device.

36. The processor of claim 35, further comprising instructions for updating the sector list as the user device enters and leaves different sector coverage areas.

37. The processor of claim 36, further comprising instructions for selecting a new serving sector when a sector in the sector list is determined to have a greater beacon channel SINR than a current serving sector.

38. The processor of claim 34, the wireless communication environment is a TDD UMTS wireless communication environment.

39. The processor of claim 34, the wireless communication environment is at least one of an OFDMA wireless communication environment and an SC-FDMA wireless communication environment.

40. A mobile device employing a first scrambling code that facilitates communicating over a wireless network, the mobile device comprising:

a processor that
generates a virtual active set (VAS) comprising a list of sectors trying to receive or demodulate a transmission from the mobile device based at least in part on knowledge of the first scrambling code, wherein the list of sectors comprises a sector assigned the first scrambling code and an advanced multi-user detection (AMU D) sector assigned a second scrambling code, and wherein the first and second scrambling codes are different, updates the VAS as the mobile device traverses a plurality of sectors, and includes in the VAS a nominal sector with the first scrambling code that is employed by a user device for transmissions from the user device;

a memory that stores the VAS; and a beacon channel signal-to-interference-plus-noise ratio (SINR) analyzer that evaluates beacon channel strength from each sector in the VAS and provides such information to the processor;

wherein the processor selects a sector in the VAS as a serving sector for data transmission to the user device based at least in part on the sector with a strongest beacon channel;

wherein the first scrambling code comprises a scrambling code of the nominal sector, which is employed by the user device, and is provided to all other sectors listed in the user device's VAS.

41. The mobile device of claim 40, wherein the device is at least one of a cellular phone, a smartphone, a laptop, a PDA, a handheld communication device, a satellite radio, a handheld computing device, and a global positioning system.

42. The mobile device of claim 40, the wireless network employs a TDD UMTS wireless communication protocol.

43. The mobile device of claim 40, the wireless network employs at least one of an OFDMA wireless communication protocol and an SC-FDMA wireless communication protocol.

44. The method of claim 1, further comprising the user device receiving resource assignments from a nominal sector of the VAS for transmission of signals from the user device, wherein the AMUD sector comprises one or more base stations that attempt to receive and demodulate transmissions from the user device using an AMUD sector technique.

* * * * *